US012406786B2

(12) United States Patent
Lee et al.

(10) Patent No.: US 12,406,786 B2
(45) Date of Patent: Sep. 2, 2025

(54) COIL COMPONENT

(71) Applicant: SAMSUNG ELECTRO-MECHANICS CO., LTD., Suwon-si (KR)

(72) Inventors: Hwan Soo Lee, Suwon-si (KR); Yoon Hee Cho, Suwon-si (KR); Sung Min Song, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 13 days.

(21) Appl. No.: 17/866,976

(22) Filed: Jul. 18, 2022

(65) Prior Publication Data

US 2022/0351883 A1 Nov. 3, 2022

Related U.S. Application Data

(63) Continuation of application No. 16/031,639, filed on Jul. 10, 2018, now Pat. No. 11,424,058.

(30) Foreign Application Priority Data

Sep. 26, 2017 (KR) ........................ 10-2017-0124287

(51) Int. Cl.
*H01F 17/00* (2006.01)
*H01F 1/14* (2006.01)
(Continued)

(52) U.S. Cl.
CPC ........... *H01F 1/14* (2013.01); *H01F 17/0013* (2013.01); *H01F 17/04* (2013.01); *H01F 27/255* (2013.01);
(Continued)

(58) Field of Classification Search
CPC ......... H01F 17/0013; H01F 2027/2804; H01F 17/0006; H01F 27/2804; H01F 5/003;
(Continued)

(56) References Cited

U.S. PATENT DOCUMENTS

2007/0030659 A1* 2/2007 Suzuki .................. H05K 1/165 336/200
2008/0218301 A1 9/2008 Yamaguchi
(Continued)

FOREIGN PATENT DOCUMENTS

CN 104700982 A 6/2015
CN 105957692 A 9/2016
(Continued)

OTHER PUBLICATIONS

Korean Office Action dated Oct. 11, 2018 issued in Korean Patent Application No. 10-2017-0124287 (with English translation).
(Continued)

*Primary Examiner* — Tszfung J Chan
(74) *Attorney, Agent, or Firm* — Morgan, Lewis & Bockius LLP

(57) ABSTRACT

A coil component includes a support member, an internal coil supported by the support member and including a plurality of coil patterns, and external electrodes connected to the internal coil and including a first layer in contact with the internal coil and a second layer disposed on the first layer. The second layer is a composite layer including a conductive material and a resin. The support member includes first and second surfaces facing the external electrodes, respectively, and one or more of at least a portion of the first surface and at least a portion of the second surface are configured as cut surfaces.

17 Claims, 4 Drawing Sheets

(51) Int. Cl.

| | |
|---|---|
| ***H01F 17/04*** | (2006.01) |
| ***H01F 27/255*** | (2006.01) |
| ***H01F 27/29*** | (2006.01) |
| ***H01F 27/30*** | (2006.01) |
| ***H01F 41/02*** | (2006.01) |
| *H01F 27/32* | (2006.01) |

(52) U.S. Cl.
CPC ......... *H01F 27/292* (2013.01); *H01F 27/306* (2013.01); *H01F 41/0246* (2013.01); *H01F 17/0033* (2013.01); *H01F 2017/0073* (2013.01); *H01F 2017/048* (2013.01); *H01F 27/324* (2013.01)

(58) Field of Classification Search
CPC .......... H01F 27/29; H01F 27/292; H01F 1/14; H01F 27/255; H01F 2017/0073; H01F 17/0033; H01F 2017/048; H01F 17/04; H01F 27/306; H01F 27/324
USPC .................................................. 336/200, 232
See application file for complete search history.

(56) References Cited

U.S. PATENT DOCUMENTS

2010/0109829 A1 5/2010 Sugiyama et al.
2013/0222101 A1* 8/2013 Ito ............................ H01F 3/08 336/83
2014/0239772 A1* 8/2014 Ota ......................... H01C 7/18 336/200
2015/0035640 A1* 2/2015 Wang .................... H01F 41/042 336/200
2015/0155093 A1 6/2015 Kim et al.
2016/0042857 A1* 2/2016 Chun ...................... H01F 17/04 336/200
2016/0225517 A1* 8/2016 Choi .................. H01F 17/0013
2016/0268038 A1 9/2016 Choi
2016/0293320 A1* 10/2016 Kim ...................... H01F 41/041
2016/0343500 A1 11/2016 Jung et al.
2017/0140866 A1 5/2017 Hong et al.
2017/0154720 A1 6/2017 Ohkubo et al.
2017/0169936 A1* 6/2017 Ishida ................. H01F 27/2804
2017/0236633 A1* 8/2017 Park ...................... H01F 27/323 336/55
2017/0243689 A1 8/2017 Yoon et al.
2017/0287621 A1 10/2017 Seino et al.
2018/0122546 A1* 5/2018 Lee ......................... H01F 27/24

FOREIGN PATENT DOCUMENTS

CN 205656940 U 10/2016
JP 111-204337 A 7/1999
JP 2007067214 A * 3/2007
JP WO2008/018203 A1 2/2008
KR 10-2016-0019266 A 2/2016
KR 10-2017-0085895 A 7/2017
KR 10-2017-0097852 A 8/2017
WO WO-2008018203 A1 * 2/2008 ......... H01F 17/0013

OTHER PUBLICATIONS

Office Action issued in corresponding Korean Application No. 10-2019-0080331 issued Jul. 8, 2019, with English translation.
Office Action issued in corresponding Chinese Patent Application No. 201811113856.4 issued Apr. 29, 2020, with English translation.
Chinese Office Action dated Mar. 30, 2022, issued in corresponding Chinese Patent Application No. 202110161519.8 (with English translation).
U.S. Notice of Allowance dated Apr. 19, 2022, issued in corresponding U.S. Appl. No. 16/031,639.

* cited by examiner

COIL COMPONENT

CROSS-REFERENCE TO RELATED APPLICATION

This application is the continuation application of U.S. patent application Ser. No. 16/031,639 filed on Jul. 10, 2018, which claims the benefit of priority to Korean Patent Application No. 10-2017-0124287 filed on Sep. 26, 2017 in the Korean Intellectual Property Office, the disclosure of which is incorporated herein by reference in its entirety.

BACKGROUND

1. Field

The present disclosure relates to a coil component, and more particularly, to a power inductor.

2. Description of Related Art

An inductor, a coil electronic component, is a typical passive element constituting an electronic circuit together with a resistor and a capacitor to cancel noise. Such an inductor, based on electromagnetic properties thereof, is used to configure a resonant circuit that amplifies a signal of a specific frequency band, a filter circuit, and the like, in combination with a capacitor.

In recent years, metal-based power inductors using amorphous metal or crystalline metal materials have been widely applied to mobile devices due to excellent DC bias characteristics and power conversion efficiency characteristics. In the future, metal-based power inductors are expected to gradually be expansively employed in the industrial and electric fields, and thus, power inductors satisfying high levels of reliability, for example, good contact between internal coils and external electrodes, are required.

SUMMARY

An aspect of the present disclosure may provide a coil component in which contact between an internal coil and external electrodes connected to the internal coil is improved.

According to an aspect of the present disclosure, a coil component may include a support member; an internal coil supported by the support member and including a plurality of coil patterns; and external electrodes connected to the internal coil and including a first layer in contact with the internal coil and a second layer disposed on the first layer. Here, the second layer is a composite layer including a conductive material and a resin. The support member includes first and second surfaces facing the external electrodes, respectively, and one or more of at least a portion of the first surface and at least a portion of the second surface are configured as cut surfaces non-parallel with major surfaces of the support members.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Hereinafter, a coil component 100 according to an exemplary embodiment in the present disclosure will be described, but is not limited thereto.

Figure 1:
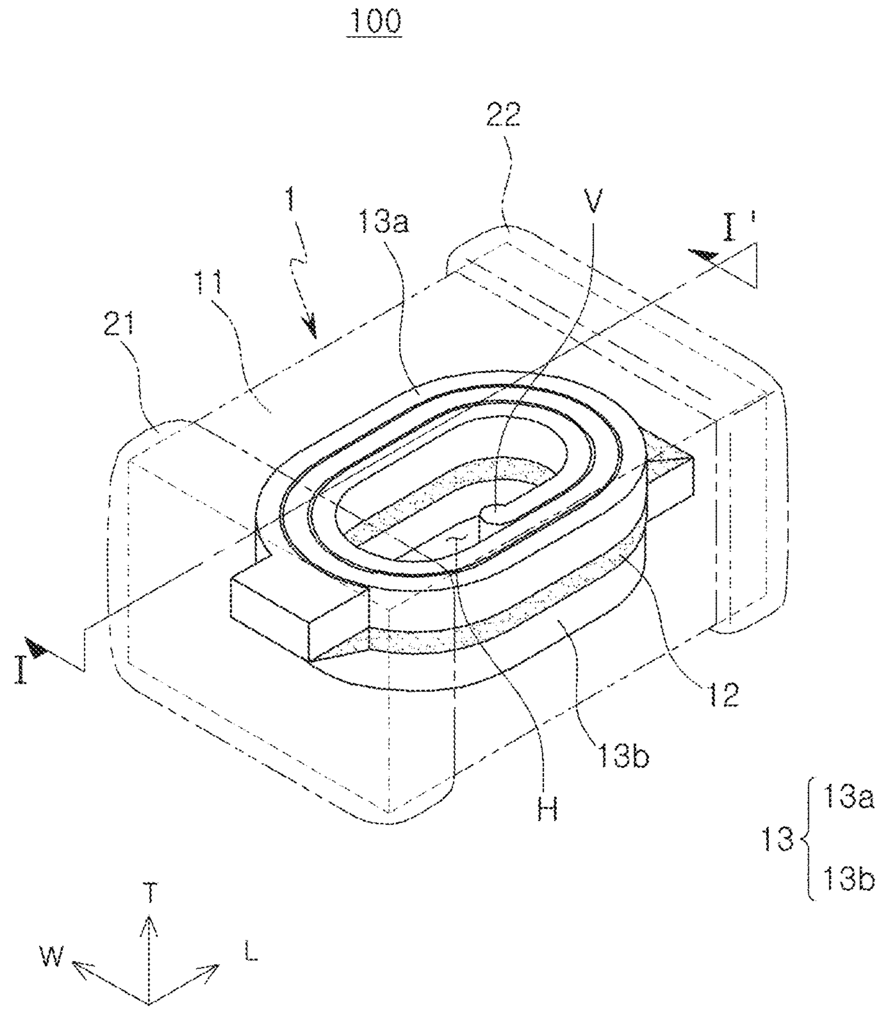
FIG. 1 is a schematic perspective view of a coil component according to an exemplary embodiment in the present disclosure.
Figure 2:
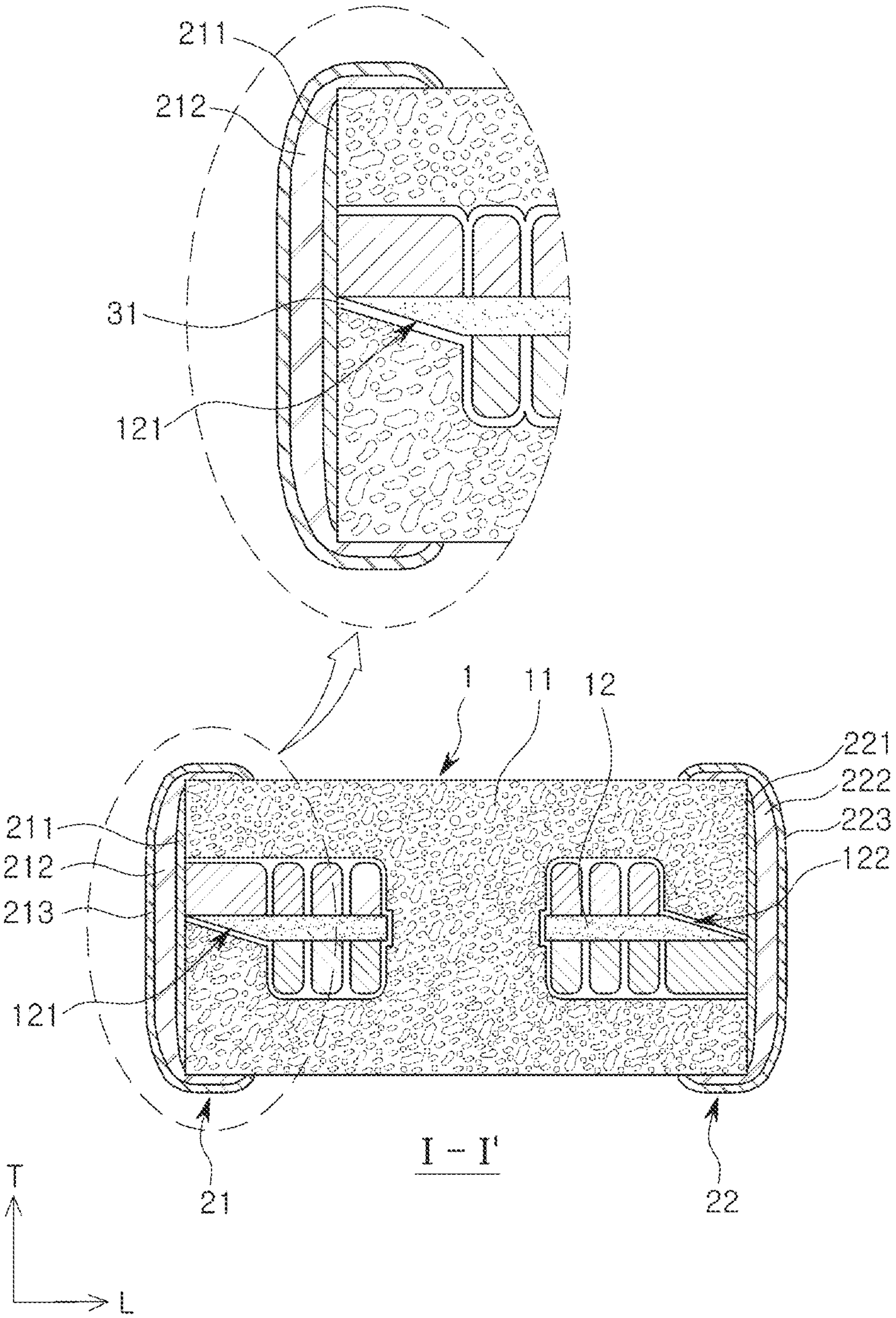
FIG. 2 is a schematic cross-sectional view taken along line I-I' in FIG. 1 according to an embodiment of the present disclosure.

FIG. 1 is a schematic perspective view of a coil component 100 according to an exemplary embodiment in the present disclosure, and FIG. 2 is a schematic cross-sectional view taken along the line I-I' of FIG. 1.

Referring to FIGS. 1 and 2, a coil component 100 according to an exemplary embodiment in the present disclosure includes a body 1 and external electrodes 21 and 22 disposed on outer surfaces of the body 1.

The body 1 shows an appearance of a coil component 100 and includes upper and lower surfaces opposing each other in the thickness direction T, first and second end surfaces opposing each other in the length direction L, and first and second side surfaces opposing each other in the width direction W, having a substantially hexahedral shape, but is not limited thereto.

The body 1 includes a magnetic material 11. For example, the body 1 may be formed to be filled with ferrite or a metal-based soft magnetic material. The ferrite may include a known ferrite such as Mn—Zn ferrite, Ni—Zn ferrite, Ni—Zn—Cu ferrite, Mn—Mg ferrite, Ba ferrite or Li ferrite. The metal-based soft magnetic material may be an alloy including at least one selected from the group consisting of Fe, Si, Cr, Al and Ni, for example, the Fe—Si—B—Cr-based amorphous metal particles but is not limited thereto. The metal-based soft magnetic material may have a particle diameter of 0.1 μm to 20 μm and may be included in a state of being dispersed in a polymer such as an epoxy resin or polyimide.

In the body 1, a support member 12 sealed by the magnetic material 11 is disposed. The support member 12 serves to facilitate formation of the internal coil 13 on an upper surface or a lower surface thereof and appropriately supports the internal coil 13. The support member 12 may be formed as a thin plate having insulation properties as a whole. For example, the support member 12 is a central core of a copper clad laminate (CCL) or a printed circuit board (PCB) but is not limited thereto. The support member 12 may have a thickness (i.e., a maximum thickness of the support member) sufficient for supporting the internal coil 13. For example, the thickness may be about 60 μm. However, when it is considered to extend a utilization field to industrial or electric field product family, it is preferable to employ a support member 12 having a thickness of about 100 μm and it is also possible to employ a support member 12 having a glass transition point (Tg) ranging from 250° C. to 350° C., i.e., having Tg characteristics of a relatively high temperature range.

An upper coil 13*a* and a lower coil 13*b* are disposed on upper and lower surfaces of the support member 12, respectively. The upper coil 13*a* and the lower coil 13*b* form the internal coil 13 as a whole. The upper and lower coils 13*a* and 13*b* are electrically connected to each other through a via electrode V formed in the support member 12. The support member 12 may further include a through hole (H) in a central portion thereof in addition to a hole for the via electrode V filled with a conductive material. The through hole is filled with a magnetic material, whereby magnetic permeability of the coil component 100 may be significantly improved. Although not shown, the via electrode V may be provided in plurality, and here, the number of the via electrodes V is not limited. The configuration of a plurality of via electrodes V is to prevent an open defect of a via. Even a single via electrode V may be sufficient for an electrical connection without a problem, but the configuration of a plurality of via electrodes V may effectively prevent an open defect without a substantial change in electrical characteristics.

Referring to FIGS. 1 and 2, the support member 12 includes a first surface 121 and a second surface 122 facing the external electrodes 21 and 22, respectively. The first surface 121 and/or the second surface 122 of the support member 12 are cut surfaces. Here, the fact that the first surface 121 and/or the second surface 122 of the support member 12 are cut surfaces indicates that removing at least a portion from the thin plate-like support member 12 during formation of the coil component 100 of the present disclosure is essentially included. The removing of at least a portion of the support member 12 is not limited to a specific method.

For example, at least a portion of the first surface 121 and/or the second surface 122 of the support member 12 may be removed using a $CO_2$ laser. As a result, the first surface 121 and/or the second surface 122 may have a thickness smaller than a maximum thickness of the support member 12, and the first surface 121 and/or the second surface 122 may each be reduced in thickness toward the first external electrode 21 and the second external electrode 22, but is not limited thereto.

A removal shape of the first and second surfaces 121 and 122 of the support member 12 is not particularly limited and may be appropriately selected by a person skilled in the art. For example, as illustrated in FIGS. 1 and 2, the support member 12 may be removed in a predetermined ratio in the length direction L, but without being limited thereto, the first and second surfaces 121 and 122 may be appropriately varied to have a concave or convex curved shape. Also, the cut surface 121 and 122 may be non-parallel to the major surfaces of the support member 12.

Since the first surface 121 and/or the second surface 122 of the support member 12 are formed as cut surfaces, the first external electrode 21 or the second external electrode 22 facing the first surface 121 or the second surface 122 and the support member 12 are prevented from being in direct contact with each other. That is, since first layers 211 and 221, which are the innermost surfaces of the first and second external electrodes 21 and 22, do not contain a resin and are formed of a single metal or an alloy, the first layers 211 and 221 and the support member 12 formed of a material (e.g. insulation characteristic material) which does not have great bonding strength with the first layers 211 and 221 are prevented from being in direct contact with each other to degrade mutual adhesion. A space between the first layer 211 or 221 and the first surface 121 or the second surface 122 of the support member 12 may be filled with a magnetic material of the body 11. The magnetic material of the body 11 may certainly improve magnetic permeability and prevent direct contact of the first layers 211 and 221 with the support member 12.

An insulating layer 31 including a material having insulating properties is disposed on surfaces of the first and second surfaces 121 and 122. There is no space for arrangement of a separate insulating layer 31 on both end surfaces of the related art support member opposing each other in the length direction L of the conventional support member. In contrast, in the coil component 100 according to an exemplary embodiment in the present disclosure, since the first and second surfaces 121 and 122 of the support member 12, as well as the through hole at the central portion of the support member 12, are formed after the coils 13 are formed on the upper and lower surfaces of the support member 12 (e.g., through plating), the surfaces of the first and second surfaces 121 and 122 of the support member 12 may be coated with the insulating layer 31 during a process of insulating the coil 13 subsequently applied after the plating process. A specific thickness is not limited and the insulating layer 31 may have the substantially same thickness as an insulation thickness formed on the coil patterns 13. Also, a material of the insulating layer 31 is not limited. For example, the insulating layer 31 may be formed of a perylene resin capable of forming a uniform insulating layer 31 through chemical vapor deposition (CVD) but is not limited thereto. Also, as illustrated in FIG. 2, since the insulating layer 31 is formed through the same process as the insulating layer 31 for insulating coil patterns 13 therebetween, the insulating layer 31 naturally continuously extends, as the insulating layer 31 for insulating the coil patterns 13, to the insulating layer 31 disposed on the coil patterns 13.

Referring to the first and second external electrodes 21 and 22, respectively facing the first and second surfaces 121 and 122 of the support member 12, the first and second external electrodes 21 and 22 include the first layers 211 and 221 and second layers 212 and 222 disposed thereon, respectively. Since descriptions of the first external electrode 21 may be applied to the second external electrode 22 as is, redundant descriptions of the second external electrode 22 will be omitted for the purposes of description. The first layer 211 and the second layer 212 of the first external electrode 21 are form of materials having different characteristics. A greatest difference between the first layer 211 and the second layer 212 is that the first layer 211 does not contain a resin while the second layer 212 includes a resin with a conductive material dispersed therein. For example, the first layer 211 may include Cu and/or Ni, while the second layer 212 may be formed of a silver (Ag)-epoxy composite but is not limited thereto. There is no limitation in a method of forming the first layer 211 on the first and second end surfaces of the body 11, respectively. A method may be appropriately selected by a person skilled in the art in consideration of process requirements and required characteristic values. For example, a plating process, a process of applying a metal paste, or a process of depositing by sputtering may be utilized. Since the second layer 212 is formed of a copper-epoxy composite, both improvement of conductivity of the external electrode 21 and improvement of molding characteristics may be realized, while a bonding force with respect to a magnetic material and a conductive material constituting the internal coil 13 may be relatively lowered. Here, since the first layer 211 formed of only a single metal or alloy without a resin is interposed as a buffer layer between the second layer 212 and the body 11, contact reliability between the body 11 and the external electrodes 21 and 22 may be improved and contact resistance may be lowered.

The second layer 212 may be formed to cover the entire surface of the first layer 211, and a third layer 213 may be additionally disposed on a surface of the second layer 212 to include at least one of Ni and Sn. The third layer 213 may be configured as a layer for facilitating soldering, or the like, when the coil component 100 is mounted.

A half of a maximum thickness Ts of the support member 12 may be controlled to be equal to or greater than maximum thicknesses Te1 and Te2 of the first layers 211 and 221 of the first and second external electrodes 21 and 22, respectively. If the maximum thickness of the first layer 211 has a value larger than the half of the maximum thickness of the support member 12, it is not possible to reduce the thickness of the external electrodes 21 and 22 including the second layer 212 as well as the first layer 211, and as a result, miniaturization of the coil component 100 may not be achieved.

Figure 3:
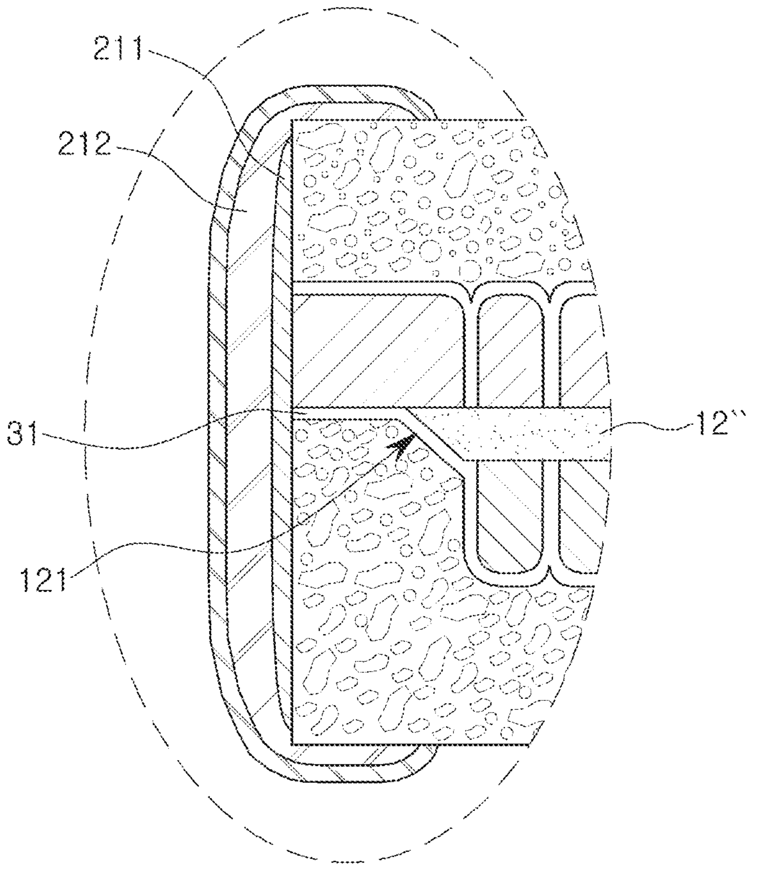
FIG. 3 is a schematic cross-sectional view taken along line I-I' in FIG. 1 according to another embodiment of the present disclosure.

FIG. 3 shows a modification of the inset shown in FIG. 2 according to another embodiment of the present disclosure. In this embodiment, the first and second surfaces 121 and 122 are formed to be slant surfaces, spacing the end of the support member 12" apart from the external electrodes 21 and 22. Also, the end of the support member 12" having the first or second surface 121 or 122 may contact a central region of the coil pattern 13 contacting the external electrodes 21 and 22.

Figure 4:
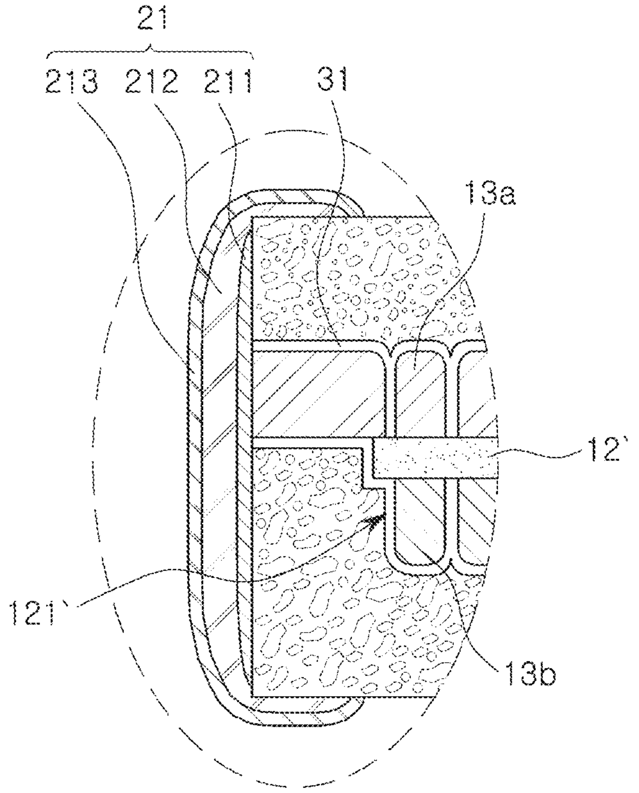
FIG. 4 is a schematic cross-sectional view of a region "A" of FIG. 2 according to a modification.

FIG. 4 is a schematic cross-sectional view according to a modification of the region A of FIG. 2. Compared with FIG. 2, FIG. 4 includes the substantially same components, except that shapes of the first and second surfaces 121 and 122 of a support member 12' in the region A are different, and thus, for the purposes of description, descriptions other than the difference in components between the coil component 100 of FIG. 2 and the coil component 100 of FIG. 4 will be omitted and the same reference numerals will be used for the same components. Also, descriptions of the first surface 121 of the support member 12' may also be applied as is to the second surface 122, and thus, only the first surface 121 of the support member 12' will be described and redundant descriptions of the second surface will be omitted.

Referring to FIG. 4, the support member 12' has a substantially uniform thickness in relation to the length direction L of the body 11, which is different from the support member 12 of the coil component 100 of FIG. 2 in which the substantially uniform thickness is maintained in relation to the length direction L of the body 11 and reduced in the first and second surfaces 121 and 122 in relation to the length direction L of the body 11. A thickness formed by the first surface 121' of the support member 12' is substantially equal to a thickness of the support member 12' formed in the other position of the support member 12', while a total length of the support member 12' extending in the length direction L of the body 11 is relatively short. This means that the first surface 121' is formed to be substantially perpendicular to a plurality of coil patterns 13 of the internal coil 13 such as a lead pattern of the internal coil 13, and is spaced apart from the first layer 211 of the external electrodes 21 and 22 at a predetermined distance. Here, a person skilled in the art may appropriately selectively remove a portion of the support member 12' by the predetermined distance, and in this case, the portion of the support member 12' may be removed to the extent that the upper coil 13*a* disposed on an upper surface of the support member 12' and the lower coil 13*b* disposed on a lower surface of the support member 12' are sufficiently directly connected by a via electrode inside the support member 12', while the remaining portions of the support member 12' appropriately support the internal coil 13 supported thereby.

Except for the above descriptions, redundant descriptions of the coil component 100 according to the exemplary embodiment in the present disclosure described above will be omitted.

According to the coil component 100 described above, in the coil component 100 having the external electrodes 21 and 22 including the metal-resin composite layer as at least one layer, the overall thickness of the external electrodes 21 and 22 is reduced, while solving the problem of adhesion reliability between the body and the external electrodes, to follow the trend of miniaturized electronic components.

As set forth above, according to exemplary embodiments of the present disclosure, the coil component 100 having improved reliability and a low Rdc value by improving contact characteristics between the internal coil 13 and the external electrodes 21 and 22 may be provided.

While exemplary embodiments have been shown and described above, it will be apparent to those skilled in the art that modifications and variations could be made without departing from the scope of the present disclosure as defined by the appended claims.

What is claimed is:

1. A coil component comprising:
a body comprising a magnetic material;
a support member disposed in the body;
an internal coil disposed on the support member and including a body pattern including a plurality of turns and a lead pattern connected to an outermost turn of the body pattern;
an insulating layer disposed on the internal coil; and
external electrodes disposed on the body and including a first layer contacting the lead pattern and a second layer disposed on the first layer,
wherein the support member includes a support portion contacting a lower surface of the body pattern, and an extended portion contacting one region of a lower surface of the lead pattern and spaced apart from the first layer of each of the external electrodes in a direction parallel to the support member by the magnetic material of the body, and
the insulating layer extends continuously on a surface of the internal coil and a surface of the support member that is not in contact with the internal coil to separate the support member and the internal coil from the magnetic material, and
the magnetic material encapsulates the support member, the internal coil and the insulating layer to form the body.

2. The coil component of claim 1, wherein the first layer is formed of a single metal or an alloy.

3. The coil component of claim 2, wherein the first layer comprises copper (Cu).

4. The coil component of claim 1, wherein the second layer comprises a conductive material and a resin.

5. The coil component of claim 1, wherein a space from the extended portion of the support member to the first layer is filled with the magnetic material.

6. The coil component of claims 1, wherein a thickness of at least a portion of the extended portion is thinner than a thickness of the support portion.

7. The coil component of claim 6, wherein a thickness of the extension portion is reduced in a direction, toward the first layer.

8. The coil component of claim 1, wherein the insulating layer is continuously disposed on the plurality of turns of the body pattern and the lead pattern.

9. The coil component of claim 1, wherein a maximum thickness of the first layer has a value equal to half or less of a maximum thickness of the support member.

10. The coil component of claim 1, wherein the second layer is spaced apart from the magnetic material in the body or the internal coil by a predetermined distance.

11. The coil component of claim 1, wherein the first layer does not comprise a resin.

12. The coil component of claim 1, wherein the internal coil comprises an upper coil disposed on an upper surface of the support member, and a lower coil disposed on a lower surface of the support member, wherein the upper and lower coils are electrically connected to each other by one or more vias passing through the support member.

13. The coil component of claim 1, further comprising:

a third layer disposed on a surface of the second layer, wherein the third layer includes at least one of Ni and Sn.

14. A coil component comprising:

a body comprising a magnetic material;

a support member disposed in the body;

an internal coil disposed on the support member and including a body pattern including a plurality of turns and a lead pattern connected to an outermost turn of the body pattern;

an insulating layer contacting disposed over the internal coil and contiguously extending to at least a portion of a side surface of the support member; and external electrodes disposed on the body and including a first layer contacting the lead pattern and a second layer disposed on the first layer, wherein the support member includes a support portion contacting a lower surface of the body pattern, and an extended portion contacting one region of a lower surface of the lead pattern and spaced apart from the first layer of each of the external electrodes in a direction parallel to the support member by the magnetic material of the body, the insulating layer extends continuously on a surface of the internal coil and a surface of the support member that is not in contact with the internal coil to separate the support member and the internal coil from the magnetic material, the magnetic material encapsulates the support member, the internal coil and the insulating layer to form the body, and a thickness of at least a portion of the extended portion is thinner than a thickness of the support portion.

15. The coil component of claim 14, wherein a thickness of the extension portion is reduced in a direction, toward the first layer.

16. The coil component of claim 14, wherein a space from the extended portion of the support member to the first layer is filled with the magnetic material.

17. The coil component of claim 14, wherein the second layer comprises a conductive material and a resin.

* * * * *